Figure 1:
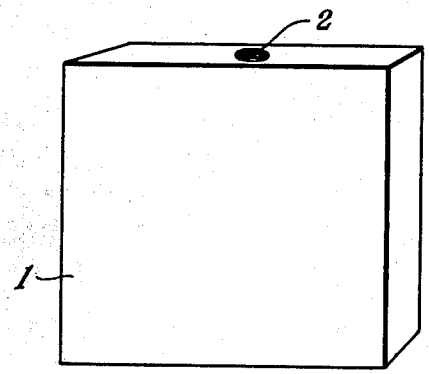

Oct. 22, 1946.  K. E. STOBER  2,409,910

METHOD OF FILLING CONTAINERS WITH RESINOUS FOAM

Filed Nov. 29, 1944

INVENTOR.
Kenneth E. Stober
BY

Griswold & Burdick
ATTORNEYS

Patented Oct. 22, 1946

2,409,910

UNITED STATES PATENT OFFICE 2,409,910

METHOD OF FILLING CONTAINERS WITH RESINOUS FOAM

Kenneth E. Stober, Midland, Mich., assignor to The Dow Chemical Company, Midland, Mich., a corporation of Michigan Application November 29, 1944, Serial No. 565,762

7 Claims. (Cl. 18—48)

This invention concerns a method of filling a container with a cellular mass of a solid resinous polymer or copolymer of a monovinyl aromatic compound, particularly styrene. For convenience, such polymers and copolymers are referred to as "vinyl aromatic resins" and the cellular products are termed "foams." The invention may be applied in the manufacture of a variety of products such as buoys, rafts, floats, sections of boats, or insulating panels for refrigerators, etc.

In United States Patent 2,023,204 it is disclosed that a cellular mass of polystyrene may be produced by heating solid polystyrene and a gas such as methyl chloride in a closed vessel under a pressure of about 30 atmospheres to a temperature above the fusion point of the polymer, i. e. to about 170° C., so as to cause absorption of the gas by the polymer and thereafter opening a bottom valve so to permit flow of the polymer from the vessel. During flow from the vessel, the polymer is swollen by expansion of the gas and is caused to assume the form of a somewhat elastic, non-brittle, cellular body composed for the most part of the individual closed cells. The product is an excellent insulating material. In said patent it is also taught that, instead of discharging the heated polymer from the melting vessel into the open air, it may be forced into another vessel so as to swell and fill the latter with the resinous foam.

I have found that the method of filling vessels with polystyrene foam proposed in the above-mentioned patent is not convenient or well adapted to commercial practice. In the first place, the mass, as it flows into the container which is to be filled, swells rapidly while at the same time being cooled and rendered solid by expansion of the gaseous agent. As a result, it often binds upon the walls of the container so as to prevent complete filling of the latter. Also, the cells in the material produced by such extrusion into a container usually are of non-uniform size and irregular shape due apparently, to uneven cooling. Furthermore, it has been found that the operating conditions given in the example of said patent are such as to permit extrusion of the heated polystyrene mass only through an orifice of not greater than ⅛ inch diameter, i. e. when a larger orifice is used, the foam which is produced collapses within a short time after being formed. The filling of a large container by extrusion of the heated mass through such small orifice is impractical, since the foam then tends to form as a solid and fairly stiff, or rigid, cellular rod of less than one inch diameter. In order to fill completely a large container, it is necessary that the extrusion be continued so as to cause repeated bending or breakage of the cellular rod with packing together of the sections thereof. This is difficult to accomplish and is impractical.

I have found that a pressure-resistant container, e. g. a drum or a hollow metal panel, may advantageously be filled with a foam of a vinyl aromatic resin by forming under pressure within the same a gel of the resin and a normally gaseous agent which is at least sparingly soluble in the resin and thereafter opening a top valve on the container so as to release the pressure and permit escape of the normally gaseous agent. The dissolved agent is thereby caused to expand with resultant cooling and swelling of the gel to form a solid foam which fills the container. By operating in this way, a container of large size, e. g. of from 1 to 6-foot diameter and from 1 to 10 feet in height, may readily be filled with a solid resinous foam of quite uniform cell size. Because of the fact that the foam comprises a mass of individual closed cells, a float which has been filled with the foam does not sink, even though its outer shell be ruptured.

However, in order satisfactorily to fill a container with a solid foam which is stable and does not collapse on standing, it is necessary that the operations of forming the foam be carried out under certain conditions hereinafter described.

In order to assure formation of a stable foam which will not subsequently collapse, it is necessary that the proportion of the normally gaseous agent which is dissolved in the resin gel be within certain limits. It is also important, although not in all instances essential, that the gel be at a temperature below the liquefying temperature of the resin alone when the pressure is released. In some instances, the gel may be at room temperature when the pressure is released, but it usually is more convenient to form the gel by heating the granular thermoplastic resin and the normally gaseous agent, e. g. to 50–130° C., in the closed vessel and to release the pressure while the gel is at such elevated temperature.

The foam, is, of course, structurally stable only when at approximately the heat distortion temperature or lower, and it is desirable that the foam, when formed, be at such a temperature. Since the vinyl aromatic resins and the foams prepared therefrom are poor conductors of heat, the cooling during formation of the foam is due almost entirely to vaporization and expansion of the normally gaseous agent contained in the gel.

Accordingly, when the pressure is to be released while the gel is at a temperature above the heat distortion temperature of the resin, it is necessary that the gel contain the normally gaseous agent in amount sufficient so that upon vaporization and expansion of the agent it will cool the resin to approximately the heat distortion temperature, or lower, during formation of the foam. In this connection, it may be mentioned that the polymers sometimes become rubbery as they are cooled to approach the heat distortion temperature and that sufficient gas is trapped in the cells to prevent collapse during further and more gradual cooling. In such instance, immediate cooling to as much as 10° C. above the actual heat distortion temperature may be permitted. However, when the polymer contains a plasticizing agent which lowers its heat distortion temperature, or when sufficient of the normally gaseous agent remained dissolved in the polymer to lower its heat distortion temperature, the temperature to which the polymer must be cooled immediately after formation of the cells therein may be somewhat below the heat distortion temperature of the polymer alone. In most instances, the temperature below which the mass must be cooled during formation of the foam is within 10° C. of the heat distortion temperature of the polymer alone.

From the facts just stated, it will be seen that an increase in the temperature of the gel above the heat distortion temperature of the resin at the time when the pressure is released necessitates an increase in the proportion of the normally gaseous agent which must be dissolved in the gel in order to obtain adequate cooling during formation of the foam. Also, the gel may advantageously be at a temperature below the critical temperature of the normally gaseous agent when the pressure is released. For both of these reasons, it is desirable that the gel be at a temperature not greatly in excess of the heat distortion temperature of the resin when the pressure is released. In practice, it has been found desirable that the pressure be released when the gel is at a temperature below 130° C. and usually between 50° and 125° C.

It also is necessary that the resin gel contain the normally gaseous agent in amount such as to be almost entirely vaporized upon release of the pressure, i. e. the cells of the freshly formed foam should not retain the agent in liquefied form. If too great a proportion of the volatile agent is used, it may, upon release of the pressure rapidly cool the polymer and render it rigid before vaporization of the agent is substantially complete. The solvent thus trapped in the product has the effect of lowering the heat distortion temperature of the latter and often causes it to collapse on standing. For instance, methyl chloride has been dissolved under pressure in polystyrene in amount such that upon release of the pressure the polymer was swelled to a cellular body and was at the same time cooled to about −30° C. by vaporization and expansion of a portion of the methyl chloride. While at such low temperature, the cellular product was of good appearance, but after standing for one-half hour or more it collapsed. Apparently, the unvaporized methyl chloride which remained trapped in the product had reduced the heat distortion temperature to about room temperature or lower with resultant collapse of the cells during gradual warming of the product to approach room temperature.

Other conditions, such as the kinds of normally gaseous agent and of vinyl aromatic resin used in forming the cellular product and the temperature of, and pressure on, the resin gel when the pressure is released, also influence both the lower and upper limits to the proportions in which said agent may satisfactorily be dissolved in the polymer; hence, said limits cannot be expressed numerically. In practice, the normally gaseous agent is employed in a proportion such as to be vaporized almost completely on release of the pressure and such that during vaporization and expansion upon release of the pressure it not only renders the product cellular, but at the same time cools it to a temperature below 85° C. The freshly prepared cellular product usually retains, in unvaporized form, not more than 5 per cent by weight of the normally gaseous agent employed to cause formation of its cells.

Although the range of proportions over which a normally gaseous agent may be dissolved in a vinyl aromatic resin to form a gel from which a stable resin foam may be obtained is dependent upon variable conditions such as the particular agent employed and the temperature and pressure prior to release of the vapor pressure on the gel, suitable proportions may be calculated with sufficient accuracy. Since the principal cooling action on the part of the normally gaseous agent is due to its heat of vaporization, it is sufficient in making such calculation to know the heat of vaporization of said agent, the amount and specific heat of the resin which is employed, the temperature to which the gel is to be brought before releasing the pressure, and the limits to the range of temperatures to which the resin should be cooled by vaporization of the agent upon release of the pressure. For purpose of the calculation, the limits to said range of temperatures may, in most instances, be considered as −30° and 85° C., although even lower temperatures are obtainable. By calculating the amounts of a given normally gaseous agent which must be dissolved under pressure in the resin in order to cool the latter to −30° and 85° C., respectively, upon release of the pressure, a range of proportions in which the agent may be employed is indicated. By choosing a mid-value in this range, a cellular product of good quality may be obtained. It will be understood that in order to dissolve in a vinyl aromatic resin the amount of normally gaseous agent thus calculated, a somewhat larger amount of the agent must be charged into the container within which the gel is to be formed. This amount of agent, in excess of that required to form the gel, is minor and may ordinarily be neglected. If desired, it may be calculated on a basis of the "vapor space" within the container, i. e. the space not occupied by the unvaporized materials which form the gel. Such calculations are of a kind usual in the art and do not require illustration.

Examples of vinyl aromatic resins which may be used in forming foams within a container are the solid benzene-soluble polymers of styrene, ortho - methyl - styrene, para - methyl - styrene, ortho-ethyl-styrene, meta-ethyl-styrene, para-ethyl - styrene, para - isopropyl - styrene, ortho-chloro-styrene, meta-chloro-styrene, or para-chloro-styrene and the resinous benzene-soluble copolymers of any of said monovinyl aromatic compounds with other polymerizable vinyl or vinylidene compounds such as methyl methacrylate, vinyl chloride, vinylidene chloride, or vinyl acetate, etc. Because of its availability, low cost, and the convenience with which it may be employed for the purpose, polystyrene is preferred.

Examples of normally gaseous agents which may be used in the process are methyl chloride, ethyl chloride, methyl ether, trichloro-monofluoro-methane, dichloro-difluoro-methane, mono-chloro-trifluoro-methane, and normally gaseous olefines such as ethylene, propylene, or butylene, etc. Cracked-oil gas fractions which consist for the most part of one or more of such gaseous olefines are particularly useful for the preparation of cellular polystyrene, since they may readily be dissolved in the polymer at increased pressures, e. g. of from 10 to 30 atmospheres, in amount sufficient to form a polystyrene foam, but not in amount exceeding that which will permit formation of such product. The rate of solution of such cracked-oil gas fraction in solid polystyrene is slow at room temperature, even when applying pressure, but is satisfactorily rapid at temperatures in the order of from 70° to 125° C.

The size of the cells formed in the resin foam, and also the bulk density of the latter, may be varied by changing the temperature of the gel and its content of the normally gaseous agent prior to release of the vapor pressure on the same. In general, an increase in such temperature causes a decrease in the bulk density of, and a decrease in the size of the cells in, the foam obtained from a gel having a given proportion of a normally gaseous agent dissolved therein. Under similar conditions with respect to the kinds of materials used in forming the resin gel and temperature at which the vapor pressure on the gel is released, an increase in the proportion of the normally gaseous agent dissolved in the gel results in a decrease in the bulk density of, and a decrease in the size of the cells in, the product which is formed upon release of the pressure. In all such instances, the bulk density of the foam is lower than the true density of the resin of which it is composed. It may also be mentioned that the incorporation in the resin gels of fillers such as asbestine, or hexachlorobenzene, etc., usually has the effect of decreasing the size of the cells in the product which is formed upon release of the pressure.

Figure 2:
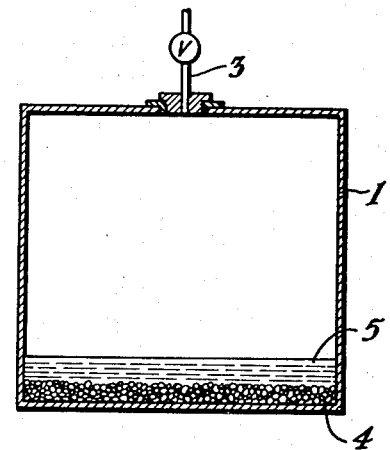
Figure 3:
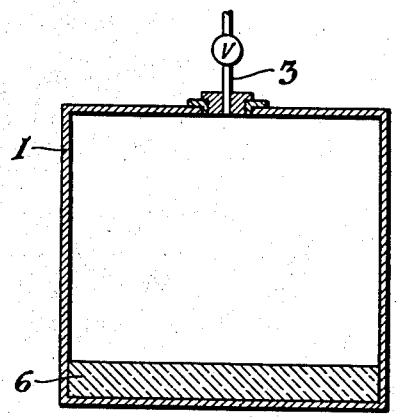
Figure 4:
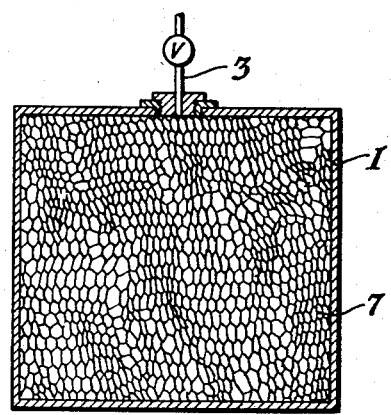

The accompanying drawing is a diagrammatic sketch illustrating one of the various ways in which the invention may be practiced. In the drawing, Figure 1 is an isometric view of a container 1 which is to be filled with a resin foam. The container 1 is provided at the top with an opening 2, for introduction of the resin from which the foam is to be prepared. Figures 2–4 are cross-sectional side views of the container 1 and a charge therein. They show the container 1 fitted at the top with a valved inlet 3. Figures 2–4 illustrate various stages in the process of filling the container with a solid foam of a resin. In Figure 2, the charge within the container is shown as a granular resin 4, e. g. of polystyrene, in contact with the normally gaseous agent 5, in liquefied form. In Figure 3, the same mixture is shown as the gel 6, which forms when the mixture is caused to stand at superatmospheric pressure. Figure 4 shows the container 1, filled with the solid resin foam 7, which forms upon release of the vapor pressure.

In practice of the invention, as illustrated in the drawing, the container is charged through opening 2 with granules or other small pieces of a vinyl aromatic resin in the amount calculated as necessary in order to fill the container with resin foam of the bulk density desired. As hereinbefore mentioned, the bulk density of a foam may be varied at will by changes in the kind or amount of the normally gaseous agent used in forming a gel of the resin, or by a change in the temperature of the gel when the vapor pressure thereon is released. The container 1 is then fitted with the valved inlet 3 and a normally gaseous agent capable of swelling the resin is introduced in amount within the limits already mentioned. The valve in inlet 3 is closed and the mixture is permitted to stand under pressure at room temperature or above, usually at a temperature between 70° and 125° C., until gel-formation is complete. The time required to form the gel varies from a few hours to several days, depending on the particular starting materials and the conditions of temperature and pressure employed, but is usually in the order of one or two days. The valve in line 3 is then opened so as to release the vapor pressure and cause formation of a foam of the resin within the container. If desired, the container to be filled with the foam may be heated, e. g. in an oven and to a wall temperature above the heat distortion temperature of the resin, when the pressure is released and after forming the foam within the container the walls of the latter may be cooled. By operating in this way tendencies of the foam to bind on the walls of the container may be overcome and the container walls may be caused to contract slightly, i. e. during cooling, and form a tight fit on the foam.

The following example describes one way in which the principle of the invention has been applied, but is not to be construed as limiting the invention.

*Example*

A cylindrical steel container, 36 inches long and of 2.75 inches internal diameter, was charged with 227 grams of granular polystyrene. The container was cooled with solid carbon dioxide and 110 cubic centimeters of liquified ethyl chloride was added to the polystyrene therein. The open end of the container was then closed with a tightly fitting metal safety disk which was capable of withstanding a pressure of 150 pounds per square inch. The closed container was permitted to stand on end at room temperature for three days, after which it was heated in a bath of boiling water for four hours. While in a vertical position and at a temperature of about 90–100° C., the safety disk was punctured with a sharp instrument. Ethyl chloride vapors escaped rapidly, leaving the container filled with a solid foam of cellular polystyrene. The polystyrene foam had a bulk density of approximately 5 pounds per cubic foot.

Other modes of applying the principle of the invention may be employed instead of those explained, change being made as regards the method herein disclosed, provided the step or steps stated by any of the following claims, or the equivalent of such stated step or steps, be employed.

I therefore particularly point out and distinctly claim as my invention:

1. In a method of filling a container with a cellular mass of a solid vinyl aromatic resin, the steps of introducing into the container a granular vinyl aromatic resin in amount corresponding to the resin content of the cellular mass with which the container is to be filled, thereafter introducing into the container a normally gaseous agent capable of being dissolved by the resin to swell the latter to a gel, said agent being introduced at superatmospheric pressure and in an amount sufficient to form a gel of the resin which is capable of flowing and from which such agent can be vaporized substantially completely upon release of the pressure with resultant swelling and cooling of the resin to form a cellular mass, maintaining the mixture within the container at superatmospheric pressure until such gel is formed, and thereafter venting vapors from an upper section of the container to cause formation of the cellular mass of the vinyl aromatic resin within the container.

2. The method, as described in claim 1, wherein the normally gaseous agent consists for the most part of at least one olefine having from three to four carbon atoms in the molecule.

3. The method, as described in claim 1, wherein the vinyl aromatic resin is polystyrene.

4. The method, as described in claim 1, wherein the vinyl aromatic resin is polystyrene and the normally gaseous agent consists for the most part of at least one olefine having from three to four carbon atoms in the molecule.

5. The method, as described in claim 1, wherein the vinyl aromatic resin is polystyrene and the normally gaseous agent is a fraction of cracked-oil gas which consists for the most part of at least one olefine having from three to four carbon atoms in the molecule.

6. The method, as described in claim 1, wherein the container is heated during formation of the foam to a wall temperature at least as high as the heat distortion temperature of the vinyl aromatic resin and, immediately after formation of the foam, is cooled to below said heat distortion temperature.

7. The method, as described in claim 1, wherein the vinyl aromatic resin is polystyrene and the container is heated, during formation of the foam, to a wall temperature at least as high as the heat distortion temperature of the resin and, immediately after formation of the foam, is cooled to below said heat distortion temperature.

KENNETH E. STOBER.